(12) United States Patent
Matsumura

(10) Patent No.: US 9,582,147 B2
(45) Date of Patent: Feb. 28, 2017

(54) INSERTING GAME OBJECTS THROUGH CONTACTLESS COMMUNICATION

(71) Applicant: Norio Matsumura, Tokyo (JP)

(72) Inventor: Norio Matsumura, Tokyo (JP)

(73) Assignees: NINTENDO CO., LTD., Kyoto (JP); THE POKÉMON COMPANY, Tokyo (JP); AMBRELLA CO., LTD., Tokyo (JP)

( * ) Notice: Subject to any disclaimer, the term of this patent is extended or adjusted under 35 U.S.C. 154(b) by 0 days.

(21) Appl. No.: 14/201,117

(22) Filed: Mar. 7, 2014

(65) Prior Publication Data

US 2014/0256430 A1    Sep. 11, 2014

(30) Foreign Application Priority Data

Mar. 8, 2013    (JP) .................................. 2013-47101

(51) Int. Cl.
| | |
|---|---|
| A63F 9/24 | (2006.01) |
| G06F 3/0482 | (2013.01) |
| A63F 13/40 | (2014.01) |
| G06F 13/38 | (2006.01) |

(52) U.S. Cl.
CPC ............ *G06F 3/0482* (2013.01); *A63F 13/10* (2013.01); *G06F 13/385* (2013.01)

(58) Field of Classification Search
CPC .............................. G06F 3/04842; A63F 13/10
See application file for complete search history.

(56) References Cited

U.S. PATENT DOCUMENTS

| | | | | |
|---|---|---|---|---|
| 5,853,327 | A | * | 12/1998 | Gilboa ............................ 463/39 |
| 2004/0214642 | A1 | * | 10/2004 | Beck ............................... 463/40 |
| 2004/0238635 | A1 | | 12/2004 | Ozaki et al. |
| 2005/0059483 | A1 | * | 3/2005 | Borge ............................. 463/29 |
| 2007/0211047 | A1 | * | 9/2007 | Doan et al. ................... 345/419 |
| 2008/0200226 | A1 | | 8/2008 | Ichimura |

(Continued)

FOREIGN PATENT DOCUMENTS

| | | |
|---|---|---|
| EP | 2 743 862 | 6/2014 |
| GB | 2 365 796 | 2/2002 |

(Continued)

OTHER PUBLICATIONS

Internet Citation/Publication, NFC Fighter, URL: http://nbrt.sakura.ne.jp/zino/nfcf/index_en.html, 2012, retrieved on Dec. 20, 2013, 6 pages.

*Primary Examiner* — Steve Rowland
(74) *Attorney, Agent, or Firm* — Nixon & Vanderhye PC

(57) ABSTRACT

An example system includes: a contactless communication unit for performing contactless communication with a data storage medium having a contactless communication function; a data acquiring unit for acquiring data stored in the data storage medium by the contactless communication unit; a display processing unit for displaying at least one content stored in a content storage unit and a content according to data acquired by the data acquiring unit on a display unit as selection objects; a selection accepting unit for accepting selection by a user for a content displayed by the display processing unit; and an information processing unit for performing information processing pertaining to a content, which is an object of selection accepted by the selection accepting unit.

16 Claims, 11 Drawing Sheets

(56) References Cited

U.S. PATENT DOCUMENTS

| | | | |
|---|---|---|---|
| 2009/0197658 A1* | 8/2009 | Polchin | 463/9 |
| 2011/0029921 A1 | 2/2011 | Terada et al. | |
| 2014/0292498 A1 | 10/2014 | Hosoya et al. | |

FOREIGN PATENT DOCUMENTS

| | | |
|---|---|---|
| JP | 2001-340663 | 12/2001 |
| JP | 2002-938 | 1/2002 |
| JP | 2002-065936 | 3/2002 |
| JP | 2004-355306 | 12/2004 |
| JP | 2005-034394 | 2/2005 |
| JP | 2007-075140 | 3/2007 |
| JP | 2008-142352 | 6/2008 |
| JP | 2008-188137 | 8/2008 |
| JP | 2009-056342 | 3/2009 |
| JP | 2009-193172 | 8/2009 |
| JP | 2010-172767 | 8/2010 |
| JP | 2011-206449 | 10/2011 |
| JP | 2012-170515 | 9/2012 |
| WO | 2013/021673 | 2/2013 |

\* cited by examiner

INSERTING GAME OBJECTS THROUGH CONTACTLESS COMMUNICATION

CROSS-REFERENCE TO RELATED APPLICATIONS

This application is based upon and claims the benefit of priority of the prior Japanese Patent Application No. 2013-047101, filed on Mar. 8, 2013, the entire contents of which are incorporated herein by reference.

FIELD

The technology herein relates to an information processing apparatus, an information processing system, an information processing method and a recording medium for performing contactless communication with a data storage medium and performing information processing related to a content according to data stored in the data storage medium.

BACKGROUND AND SUMMARY

Conventionally, contactless communication technology such as NFC (Near Field Communication) or RFID (Radio Frequency IDentification) for performing wireless communication contactlessly with an IC (Integrated Circuit) tag or the like has become widespread. In recent years, such contactless communication technology has started to be utilized in an information processing apparatus such as a game machine or a mobile phone. For example, there is a game machine, a game program or the like for performing contactless communication with a data storage medium such as a figure or a card having a built-in IC tag and reflecting data acquired from the data storage medium on the game content.

According to an aspect of the embodiment, a contactless communication unit for performing contactless communication with a data storage medium having a contactless communication function, a data acquiring unit for acquiring data stored in the data storage medium by the contactless communication unit, a display processing unit for displaying at least one content stored in a content storage unit and a content according to data acquired by the data acquiring unit on a display unit as selection objects, a selection accepting unit for accepting selection by a user for a content displayed by the display processing unit, and an information processing unit for performing information processing pertaining to a content which is an object of selection accepted by the selection accepting unit are provided.

The object and advantages of the example embodiment will be realized and attained by means of the elements and combinations particularly pointed out in the claims.

It is to be understood that both the foregoing general description and the following detailed description are exemplary and explanatory and are not restrictive of the example embodiment.

The above and further objects, features, aspects and effects of the present technology will more fully be apparent from the following detailed description by collation with accompanying drawings.

DETAILED DESCRIPTION OF NON-LIMITING EXAMPLE EMBODIMENTS

Figure 1:
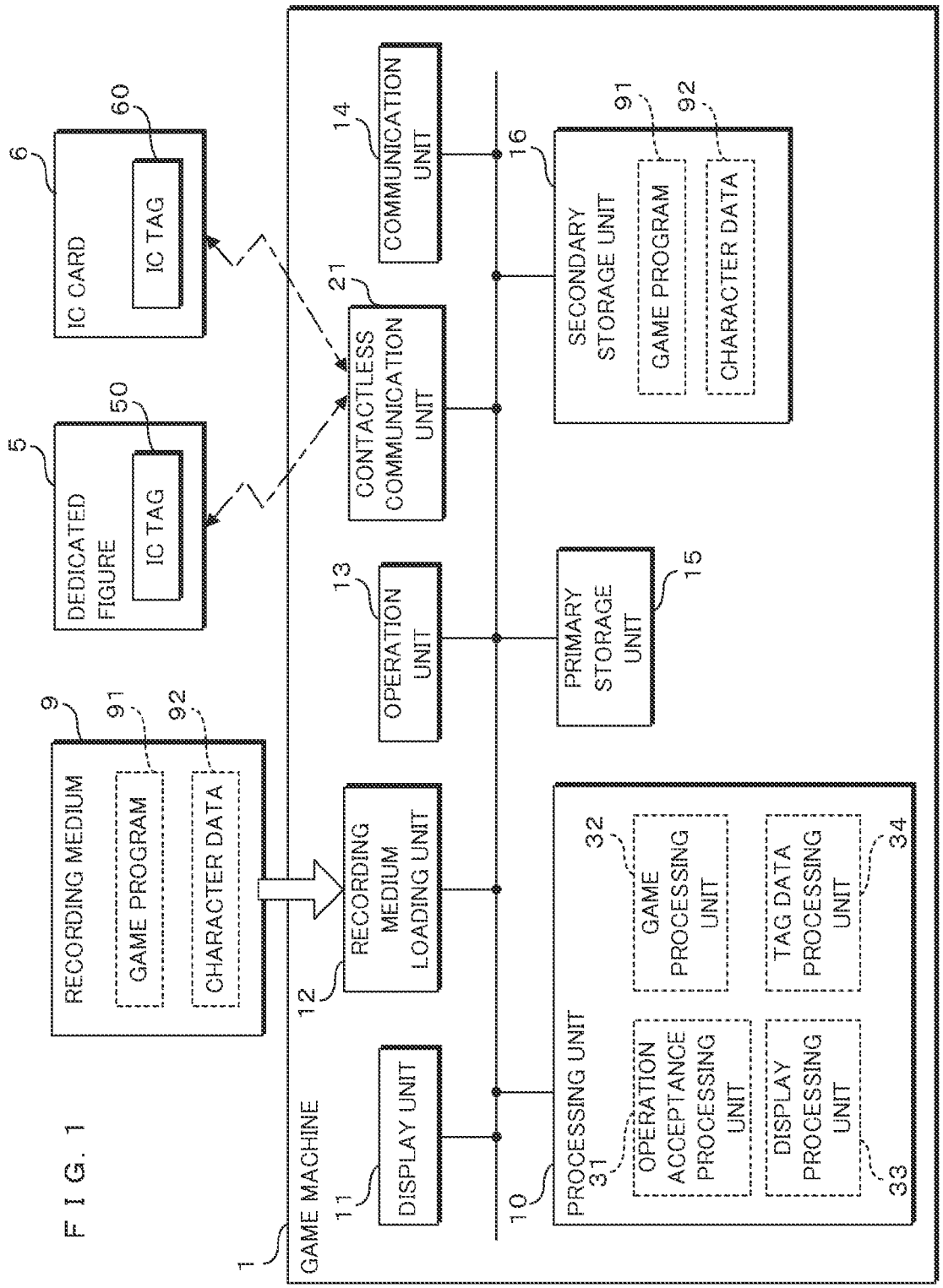
FIG. 1 shows an example non-limiting block diagram for illustrating the configuration of a game system according to the present embodiment.

FIG. 1 shows an example non-limiting block diagram for illustrating the configuration of a game system according to the present embodiment. A game system according to the present embodiment includes a game machine 1, at least one dedicated FIG. 5, and at least one IC card 6. The game machine 1 is of a portable type which can be carried by the user. The dedicated FIG. 5 and the IC card 6 are data storage media to be used in a game. The game machine 1 has a display unit 11, a recording medium loading unit 12 and an operation unit 13, which are provided in one housing. Illustration of the housing of the game machine 1 is omitted in FIG. 1. A processing unit (processor) 10, a communication unit 14, a primary storage unit 15, a secondary storage unit 16 and a contactless communication unit (a contactless communication circuit) 21 are built in the housing of the game machine 1.

The processing unit 10 of the game machine 1 is constituted of an arithmetic processing unit such as a CPU (Central Processing Unit) or an MPU (Micro Processing Unit). The processing unit 10 reads a game program 91, which is stored in the secondary storage unit 16, or a game program 91, which is recorded in a recording medium 9 mounted on the recording medium loading unit 12, into the primary storage unit 15 and executes the read game program 91. Thus, the processing unit 10 performs various information processing pertaining to a game. For example, the processing unit 10 performs processing to accept an operation performed at the operation unit 13. For example, the processing unit 10 makes a determination on a game in accordance with an accepted operation. For example, the processing unit 10 performs processing to generate a game image to be displayed at the display unit 11 in accordance with an accepted operation, an event in a game, or the like.

The display unit 11 is constituted of a liquid crystal panel, a PDP (Plasma Display Panel) or the like. The display unit 11 displays an image given from the processing unit 10. The recording medium 9 of a card type, a cassette type, a disk type or the like is attached to and detached from the recording medium loading unit 12. The processing unit 10 can read the game program 91, character data 92 and the like from the recording medium 9 mounted on the recording medium loading unit 12. The operation unit 13 is, for example, a button of a depression type or a touch panel provided at the display unit 11. The operation unit 13 notifies the processing unit 10 of the content of an operation performed by the user. The content of an operation is, for example, depression or release of a button, or the like.

The communication unit 14 transmits and receives data to and from a server machine, another game machine 1 or the like, via a network such as a mobile phone network or a wireless LAN (Local Area Network). For example, the game machine 1 can communicate with the server machine by the communication unit 14 to download the game program 91 and character data 92, and store the game program 91 and the character data 92 in the secondary storage unit 16. The primary storage unit 15 is constituted of a semiconductor memory device, for example. The primary storage unit 15 temporarily stores various data to be generated in arithmetic processing by the processing unit 10. The secondary storage unit 16 is constituted of a nonvolatile storage device having large capacity in comparison with the primary storage unit 15. The secondary storage unit 16 can store the game program 91 and the character data 92.

In one example embodiment, the contactless communication unit 21 wirelessly transmits data to and/or wirelessly receives data from the IC card 6 or the like. The IC card 6 can be active or passive, self-powered or powered by received signals. In one example embodiment, such data transmission and/or reception can be according to a conventional communication standard such as ISO/IEC 18092: 2013 (so-called "NFC" or Near Field Communications Interface and Protocol) incorporated herein by reference, for example, or any other suitable communications protocol. The communication range of the contactless communication unit 21 in some example embodiments is relatively short, such as about several centimeters to several meters. Such short range communications can for example allow devices in proximity to one another to communicate with one another without involving devices not in proximity. In one non-limiting example, the contactless communication unit 21 transmits a signal, which instructs reading of stored data, to an IC tag 50 or other device embedded in the dedicated FIG. 5 or an IC tag 60 or other device embedded in the IC card 6. In this context, an IC tag can comprise for example any of a class of devices that can in some contexts be used as an electronic identification tag that wirelessly provides identification information. But in other embodiments the device need not be an integrated circuit tag. The contactless communication unit 21 receives desired data from the IC tag 50 or 60 as a response for the transmitted signal. The contactless communication unit 21 in one example embodiment has a so-called IC tag reader function. The contactless communication unit 21 transmits data to be written together with a signal, which instructs writing of the data. Thus, the contactless communication unit 21 can cause the IC tag 50 to write the data. That is, the contactless communication unit 21 has an IC tag writer function. Here, the communication mode of the contactless communication unit 21 is not limited to NFC and may be a variety of communication modes, such as RFID, or any other type of inductive, electromagnetic or other coupling or communications including but not limited to optical, infrared, short range radio, magnetic, audio, tactile, vibrational, or any other suitable type of communications to be employed as contactless communication, short-range wireless communication or the like. In this context, "contactless" can include for example the capability to communicate without requiring electrical and/or physical contact. In other example embodiments, electrical contact and/or physical contact can be used. Additionally, some or all of the devices communicating can be wirelessly powered by inductive or other proximity coupling so that they do not need to be self-powered.

Figure 5:
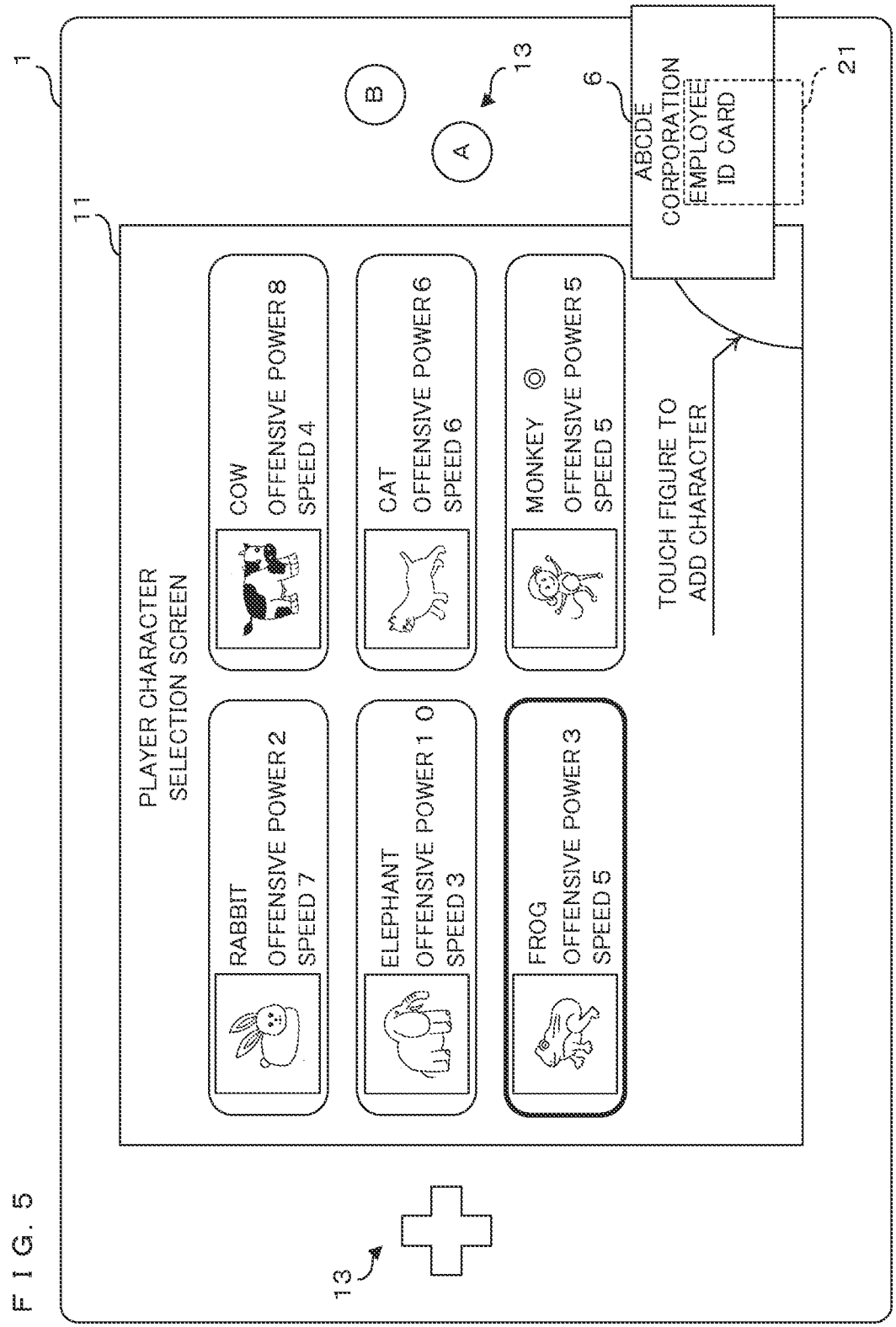
FIG. 5 shows an example non-limiting schematic diagram for explaining a method of adding a character using an IC card.

The dedicated FIG. 5 is a specific data storage medium to be used by a user in play of a specific game which is to be realized by executing a specific game program 91 at the game machine 1. Although only one dedicated FIG. 5 is illustrated in FIG. 1, a plurality of types of dedicated FIG. 5 may exist. In a specific game according to the present embodiment, a plurality of characters are prepared as player objects to be operated by the user. The dedicated FIG. 5 has a shape imitating an appearance of a character to be operated by the user in a specific game and is made of synthetic resin or the like. The IC tag 50 is embedded in the dedicated FIG. 5. The dedicated FIG. 5 can perform contactless communication with the game machine 1. The IC tag 50 of the dedicated FIG. 5 stores various data according to the character. The game machine 1 can read data from the IC tag 50 by contactless communication. The game machine 1 can update data stored in the IC tag 50, or additionally write data into the IC tag 50.

The IC card 6 is, for example, an employee ID card, a season ticket of transportation, a cash card for a bank or the like, a credit card, an electronic money card or the like. The IC card 6 is a data storage medium, which is unrelated to a specific game to be executed at the game machine 1 and is generally used. The IC tag 60 is embedded in the IC card 6. The IC card 6 can perform contactless communication with the game machine 1. It is to be noted that the IC card 6 in this example is not restrictive, and any element can be employed as long as an IC tag 60 capable of contactless communication with the game machine 1 is embedded therein. For example, a figure or the like to be used for another game may be employed.

In the game machine 1 according to the present embodiment, an operation acceptance processing unit 31, a game processing unit 32, a display processing unit 33, a tag data processing unit 34 and the like are realized as software functional blocks when the processing unit 10 executes the game program 91. The operation acceptance processing unit 31 performs processing to accept an operation by the user in a game by checking the state of the operation unit 13 periodically. The game processing unit 32 performs a variety of determination processing, event processing or the like related to a game in accordance with an operation accepted by the operation accepting unit 31. The display processing unit 33 generates a game screen according to the result of processing by the game processing unit 32 and gives the game screen to the display unit 11 so as to perform processing to display the game screen at the display unit 11. The tag data processing unit 34 performs processing to write and read data into and from the dedicated FIG. 5, the IC card 6 or the like by contactless communication by the contactless communication unit 21.

Figure 2:
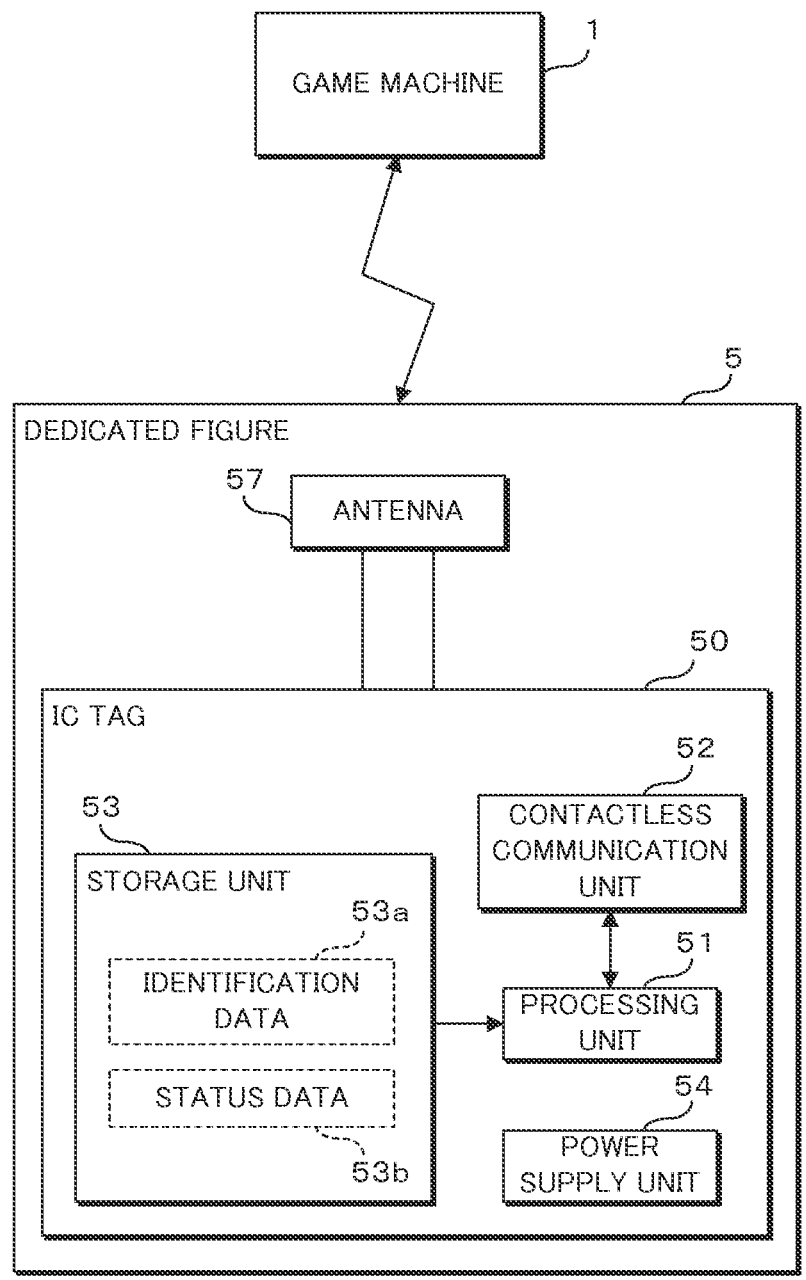
FIG. 2 shows an example non-limiting block diagram for illustrating the configuration of a dedicated figure.

FIG. 2 shows an example non-limiting block diagram for illustrating the configuration of the dedicated FIG. 5. The dedicated FIG. 5 according to the present embodiment is a data storage medium having a configuration wherein the IC tag 50 and an antenna 57 are embedded in a molded body made of synthetic resin, for example. The antenna 57 may have a configuration wherein metal wire is disposed in a spiral form in the dedicated FIG. 5 and both ends of the metal wire are connected with the IC tag 50, for example. The IC tag 50 is provided as one IC chip. The IC tag 50 has a processing unit 51, a contactless communication unit 52, a storage unit 53 and a power supply unit 54 provided therein.

The IC tag 50 does not have a power source such as a battery. The IC tag 50 operates using electro motive force to be generated by electromagnetic induction or the like upon receiving a radio signal from the game machine 1 by the antenna 57. The IC tag 50 is a so-called passive type tag. The power supply unit 54 supplies electric power to the processing unit 51, the contactless communication unit 52, the storage unit 53 and the like in the IC tag 50 on the basis of the electro motive force. The power supply enables operation of the respective units. It is to be noted that the IC tag 50 may be of an active type, though the IC tag 50 in the present embodiment is of a passive type.

The contactless communication unit 52 of the IC tag 50 receives a signal, which has been transmitted from the game machine 1, by the antenna 57 and gives data pertaining to the received signal to the processing unit 51. The contactless communication unit 52 transmits data, which has given from the processing unit 51, from the antenna 57 to the game machine 1. The storage unit 53 is constituted of a data-rewritable and nonvolatile memory device. The storage unit 53 stores identification data 53a, which is attached individually to an IC tag 50, and status data 53b of a character, which is used in a specific game. The processing unit 51 reads data from the storage unit 53 in accordance with data given from the contactless communication unit 52. The processing unit 51 gives the read data to the contactless communication unit 52 so as to transmit the data to the game machine 1. The processing unit 51 writes data into the storage unit 53 in accordance with data given from the contactless communication unit 52.

It is to be noted that illustration of the configuration of the IC card 6 is omitted in the drawings. The configuration of the IC card 6 is substantially equal to the configuration of the dedicated FIG. 5, except that identification data to be stored in the storage unit of the IC tag 60 is different. The storage unit of the IC tag 60 of the IC tag 6 does not store status data 53b similar to that of the dedicated FIG. 5, and stores a variety of data according to the purpose of use or the like of the IC card 6 instead.

Next, an example of a game, which is realized when the processing unit 10 of the game machine 1 executes the game program 91 according to the present embodiment, will be described. In the game of this example, the user collects a plurality of characters, which can be a player character, in the game. The user selects a player character from the collected characters. The user operates at least one of selected player characters at the operation unit 13, and fights or competes with an enemy character, for example. An enemy character may be operated by the processing unit 10, or may be operated by a user of another game machine 1 in the case of an online match game.

When a player character attacks and beats an enemy character in the game in this example, the user can acquire the enemy character with a constant probability. The user can select the acquired character as a player character. When the user acquires a specific item in the game or when a specific event occurs, for example, the user can acquire a new character. Information related to a character acquired by the user is stored in the secondary storage unit 16 as a possession character list, together with saved data of the game or the like.

Figure 3:
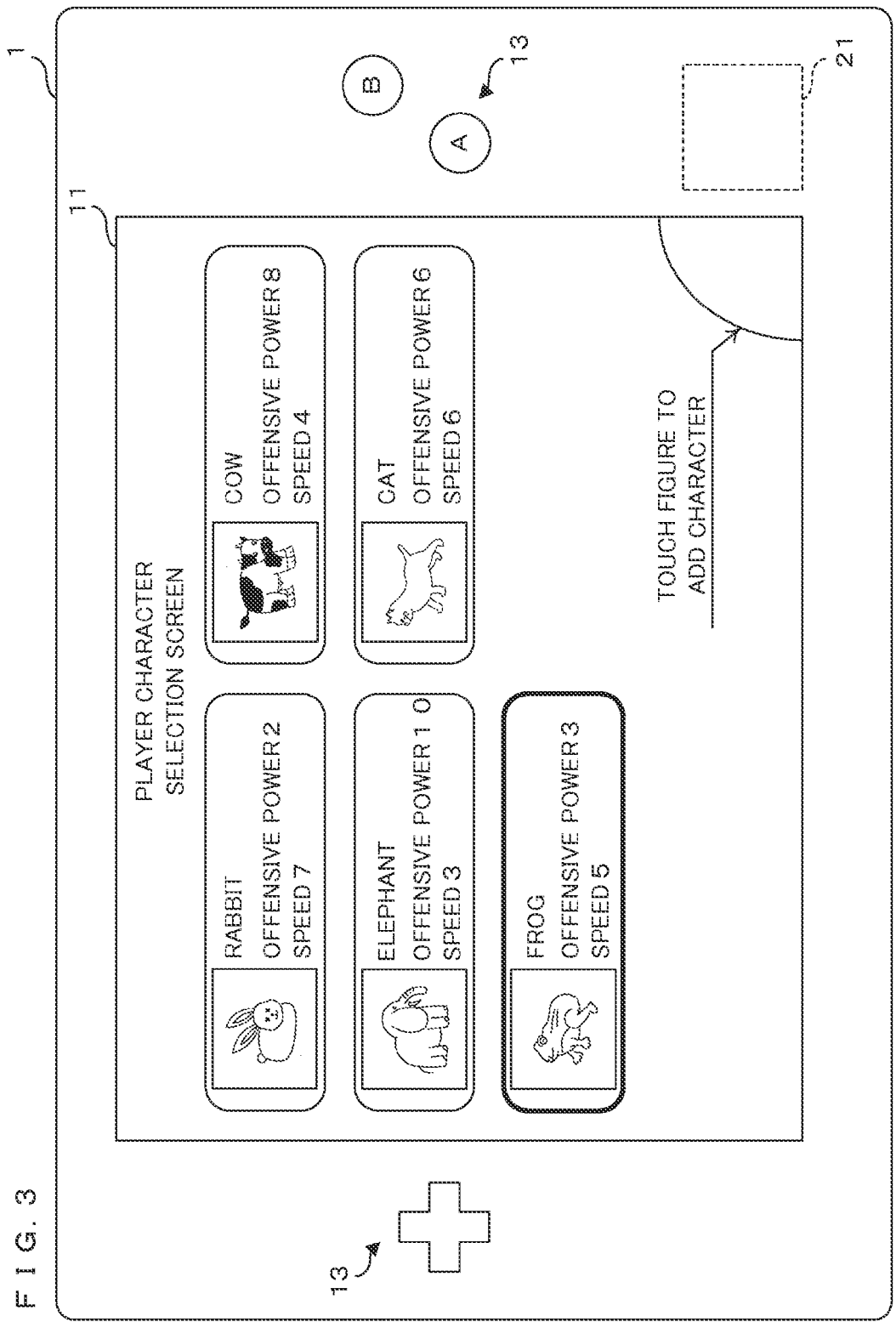
FIG. 3 shows an example non-limiting schematic diagram for illustrating an example of a player character selection screen.

Before initiation of a game, the display processing unit 33 in the processing unit 10 of the game machine 1 generates a screen to be used for selecting a player character and displays the generated screen at the display unit 11. FIG. 3 shows an example non-limiting schematic diagram for illustrating an example of a player character selection screen. The game machine 1 of a portable type illustrated in the figure has a housing having a substantially rectangular plate form. Provided at the center of a front face of the housing is the display unit 11. The housing has a cross key of the operation unit 13 provided at the left side of the display unit 11, and push buttons A and B are provided at the right side of the display unit 11. The contactless communication unit 21 is built (see a quadrate drawn with broken lines) in the housing of the game machine 1 at the right side of the display unit 11 and at a position at the lower side of the push buttons A and B.

The processing unit 10 of the game machine 1 reads the possession character list stored in the secondary storage unit 16. The processing unit 10 displays a list of characters possessed by the user as a player character selection screen at the display unit 11 on the basis of the read possession character list. In the example illustrated in the figure, the user possesses five characters of a rabbit, a cow, an elephant, a cat and a frog. In the player character selection screen, an image, a name, status and the like of each character are described in an area having substantially a horizontally long rectangular shape. In the player character selection screen, a plurality of areas having substantially a rectangular shape are arranged in vertical and horizontal lines. The user can select a player character from five displayed characters by operating the cross key of the operation unit 13. In the example illustrated in the figure, a character of a frog is being selected, and a selection state is represented by highlighting an area with a thick line. The user can confirm selection of a player character by pushing the push button A of the operation unit 13 in this state.

It is to be noted that the possession character list stored in the secondary storage unit 16 can be list information of a name of a character, an identification number for identifying a character, or the like. An image, status and the like of each character are stored as the character data 92 in the recording medium 9 or the secondary storage unit 16. The processing unit 10 of the game machine 1 acquires information such as an image and status from the character data 92 on the basis of a name, an identification number or the like of a character included in the possession character list, and generates a player character selection screen.

Figure 4:
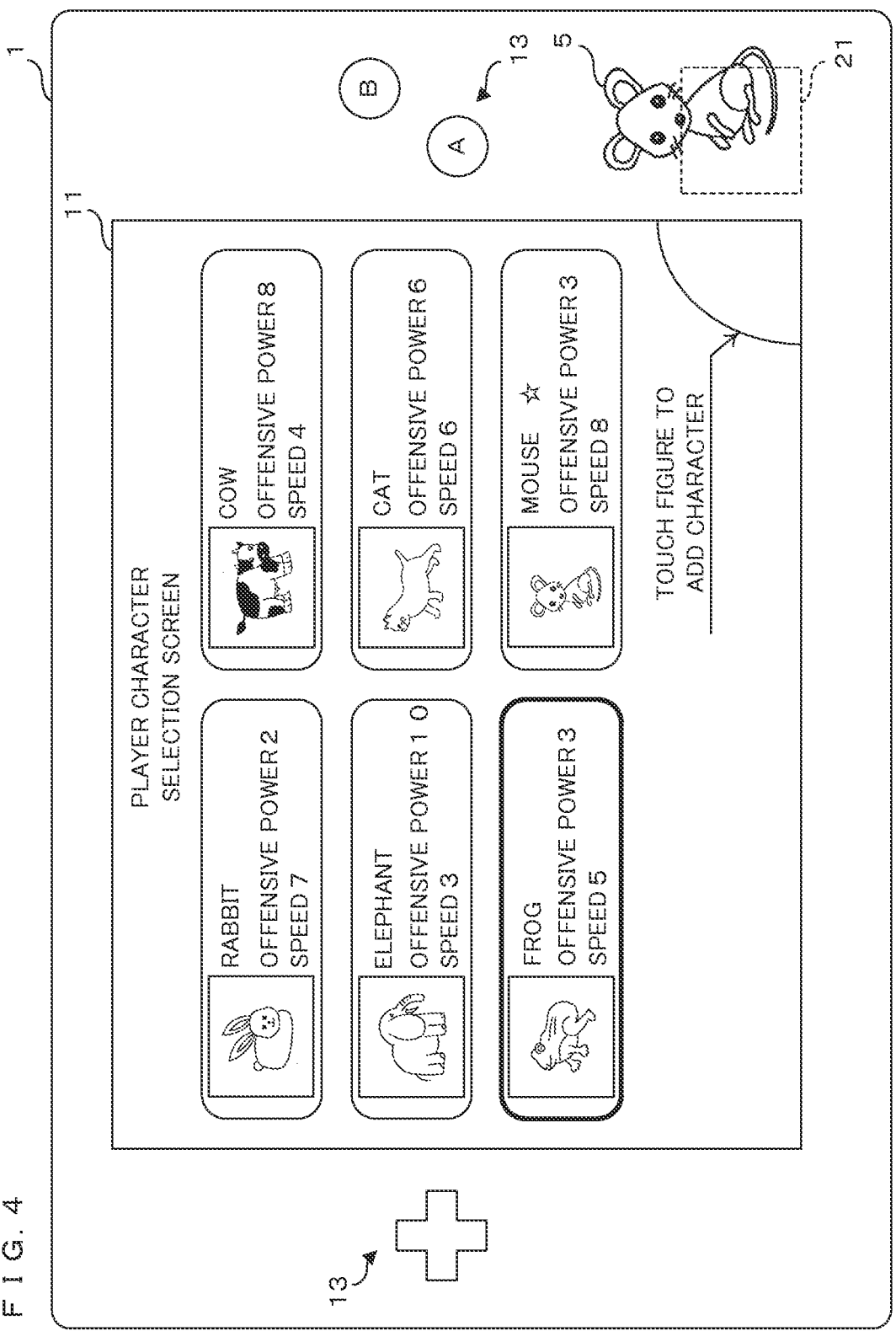
FIG. 4 shows an example non-limiting schematic diagram for explaining a method of adding a character using a dedicated figure.

With the game machine 1 according to the present embodiment, the user can add a character, which can be selected as a player character, by utilizing the dedicated FIG. 5. FIG. 4 shows an example non-limiting schematic diagram for explaining a method of adding a character using the dedicated FIG. 5. The user puts the dedicated FIG. 5, which corresponds to a character that he wants to add, close to or into contact with a place where the contactless communication unit 21 is built in the housing of the game machine 1. In the example illustrated in the figure, the dedicated FIG. 5 imitating an appearance of a mouse is put into contact with the game machine 1.

In the player character selection screen illustrated in FIGS. 3 and 4, a substantially fan-shaped graphic, a message "Touch Figure to Add Character", and an arrow from the message to the substantially fan-shaped graphic are displayed at a bottom right corner of the display unit 11. When the game machine 1 makes such display, the user can easily grasp which part of the housing of the game machine 1 the dedicated FIG. 5 is to be put into contact with.

When contactless communication with a data storage medium such as the dedicated FIG. 5 or the IC card 6 by the contactless communication unit 21 becomes possible, the processing unit 10 of the game machine 1 requests the data storage medium to transmit identification data. In response to the request from the game machine 1, the IC tag 50 of the dedicated FIG. 5 reads the identification data 53*a* stored in the storage unit 53 and transmits the read identification data 53*a*. The same goes for the IC tag 60 of the IC card 6. The processing unit 10 of the game machine 1 determines whether the received identification data is to be given to the dedicated FIG. 5 or not, so as to determine whether the partner of contactless communication is the dedicated FIG. 5 or not. For example, the game machine 1 makes a determination on the basis of a list of identification data 53*a* given to the dedicated FIG. 5.

When determining that the partner of contactless communication is the dedicated FIG. 5, the processing unit 10 of the game machine 1 requests the dedicated FIG. 5 to transmit the stats data 53*b*. In response to the request from the game machine 1, the IC tag 50 of the dedicated FIG. 5 reads the status data 53*b* stored in the storage unit 53 and transmits the read status data 53*b*. Upon receiving the status data 53*b*, the processing unit 10 of the game machine 1 adds a character according to the identification data 53*a* and the status data 53*b* to the player character selection screen and displays the player character selection screen at the display unit 11. That is, data stored in the dedicated FIG. 5 is correlated preliminarily with a content to be used for a game application. For example, the processing unit 10 judges the type of a character such as a rabbit or an elephant in accordance with the identification data 53*a* acquired from the dedicated FIG. 5. The processing unit 10 acquires data such as an image according to the type of a character from the character data 92 of the secondary storage unit 16. Here, the processing unit 10 does not use status, such as an offensive power and a speed, of a character included in the character data 92. The processing unit 10 decides the status, such as an offensive power and a speed, of a character in accordance with the status data 53*b* acquired from the dedicated FIG. 5.

In the example illustrated in FIG. 4, a character of a mouse is additionally displayed in a player character selection screen, corresponding to the dedicated FIG. 5 of a mouse. The processing unit 10 of the game machine 1 acquires image data related to a character of a mouse from the character data 92 of the secondary storage unit 16 on the basis of the identification data 53*a* acquired from the dedicated FIG. 5 and displays the acquired image data. The processing unit 10 displays an offensive power and a speed of a character of a mouse in accordance with the status data 53*b* acquired from the dedicated FIG. 5. The processing unit 10 displays a star mark after the name of the character according to the dedicated FIG. 5, so that the user can distinguish the character according to the dedicated FIG. 5 from other characters. The user can select any one character from a plurality of characters displayed in the player character selection screen and operate the selected character to play a game. Here, the user may select the character according to the dedicated FIG. 5 or select any other character. Although a star mark is displayed at the name of the character according to the dedicated FIG. 5 in the present embodiment so as to distinguish the character from other characters, it is to be noted that this is not restrictive. It is only required that a character according to the dedicated FIG. 5 and other characters are displayed in a distinguishable manner.

The processing unit 10 of the game machine 1 stores the identification data 53*a* and the status data 53*b*, which have been received from the dedicated FIG. 5, in the primary storage unit 15. When there arises a need to display a player character selection screen thereafter, the processing unit 10 displays a character included in the possession character list of the user and a character according to the identification data 53*a* and the status data 53*b* stored in the primary storage unit 15 as options. Accordingly, the user does not need to repeat a work to cause the game machine 1 to load the dedicated FIG. 5 every time a player character selection screen is displayed. Here, the identification data 53*a*, the status data 53*b* and the like stored in the primary storage unit 15 are discarded when execution of the game program 91 is terminated at the game machine 1 or when the game machine 1 is powered off, for example.

With the game machine 1 according to the present embodiment, the user can add a character, which can be selected as a player character, by utilizing the IC card 6 or the like. FIG. 5 shows an example non-limiting schematic diagram for explaining a method of adding a character using the IC card 6. The user can add a character by putting a variety of IC cards 6 such as his employee ID card (the ABCDE Corporation Employee ID Card in the figure), for example, close to or into contact with a place where the contactless communication unit 21 is built in the housing of the game machine 1.

When contactless communication with the data storage medium by the contactless communication unit 21 becomes possible, the processing unit 10 of the game machine 1 requests the data storage medium to transmit identification data. In response to the request from the game machine 1, the IC tag 60 of the IC card 6 reads identification data stored in the storage unit and transmits the read identification data. The processing unit 10 of the game machine 1 determines that the partner of contactless communication is not the dedicated FIG. 5 or, in other words, the partner of contactless communication is an IC card 6, on the basis of the received identification data.

When determining that the partner of contactless communication is the IC card 6, the processing unit 10 of the game machine 1 decides a character to be added, on the basis of the identification data of the IC card 6. The game machine 1 stores a table, an arithmetic expression or the like to be used for deciding a character on the basis of identification data. The processing unit 10 decides one character using the stored table, arithmetic expression or the like, and acquires data such as an image according to the decided character from the character data 92 of the secondary storage unit 16. That is, when the partner of contactless communication is the IC card 6, correspondence with a content is decided in accordance with the read data. For example, assume here a case where the identification data of the IC card 6 is given by a numerical value, 100 characters are included in the character data 92, and labels from 0 to 99 are attached to the respective characters. In such a case, the processing unit 10 of the game machine 1 divides identification data with 100 and calculates the remainder, so as to decide that the character of the IC card 6 is a character of a label corresponding to the calculated remainder. Here, the character deciding method is exemplary, and other methods such as decision based on random numbers may be used.

In the example illustrated in FIG. 5, a character of a monkey is additionally displayed in the player character selection screen, corresponding to the IC card 6 of an employee ID card. The processing unit 10 of the game machine 1 decides that the character is a monkey on the basis of the identification data acquired from the IC card 6. The processing unit 10 acquires image data related to a character of a monkey from the character data 92 of the secondary storage unit 16 and displays the acquired image data. The processing unit 10 acquires status, such as an offensive power and a speed, of a monkey from the character data 92 and displays the acquired status. The processing unit 10 displays a double circle mark after the name of the character according to the IC card 6, so that the user can distinguish the character according to the IC card 6 from other characters. The user may select the character according to the IC card 6 displayed in the player character selection screen, or may select another character. The processing unit 10 of the game machine 1 stores the identification data received from the IC card 6 in the primary storage unit 15. When there arises a need to display a player character selection screen thereafter, the processing unit 10 can display the character corresponding to the IC card 6 as an option in accordance with the identification data stored in the primary storage unit 15.

Although a double circle mark is displayed at the name of the character according to the IC card 6 in the present embodiment so as to distinguish the character from other characters, it is to be noted that this is not restrictive. It is only required that the character according to the IC card 6 and other characters are displayed in a distinguishable manner. Although data acquired from the dedicated FIG. 5 or the IC card 6 is stored in the primary storage unit 15 in the present embodiment, this is not restrictive. For example, data acquired from the dedicated FIG. 5 or the IC card 6 may be discarded every time the player character selection screen is hidden. The user may perform a work to load the dedicated FIG. 5 or the IC card 6 every time a player character selection screen is displayed. On the contrary, data acquired from the dedicated FIG. 5 or the IC card 6 may be stored in the secondary storage unit 16 so as to prevent the data from being discarded.

Figure 6:
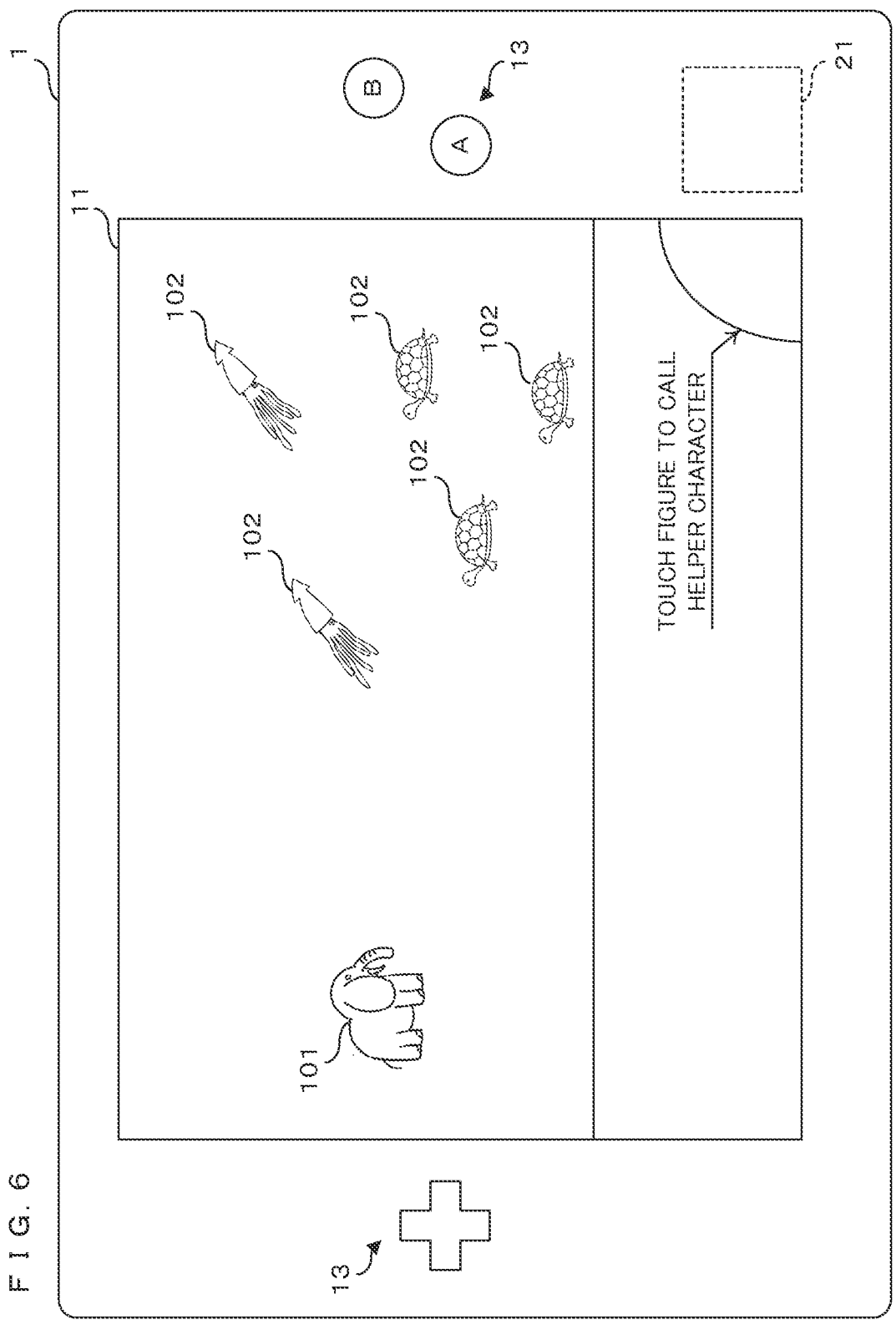
FIG. 6 shows an example non-limiting schematic diagram for explaining an example of a game.

The processing unit 10 of the game machine 1 accepts selection of a player character in the player character selection screen and then initiates game processing which uses the selected player character. FIG. 6 shows an example non-limiting schematic diagram for explaining an example of a game. In the example illustrated in the figure, a player character 101 of an elephant selected by the user, and a plurality of enemy characters 102 of turtled and squids to be controlled by the processing unit 10 of the game machine 1 are displayed at the display unit 11. The user can move the player character 101 using the cross key of the operation unit 13. The user can cause the player character 101 to attack an enemy character 102 using a push button A or B. The processing unit 10 of the game machine 1 determines success/failure of attack to an enemy character 102 by the player character 101 in accordance with an operation by the user. The processing unit 10 determines succession/failure of attack to the player character 101 by an enemy character 102.

Figure 7:
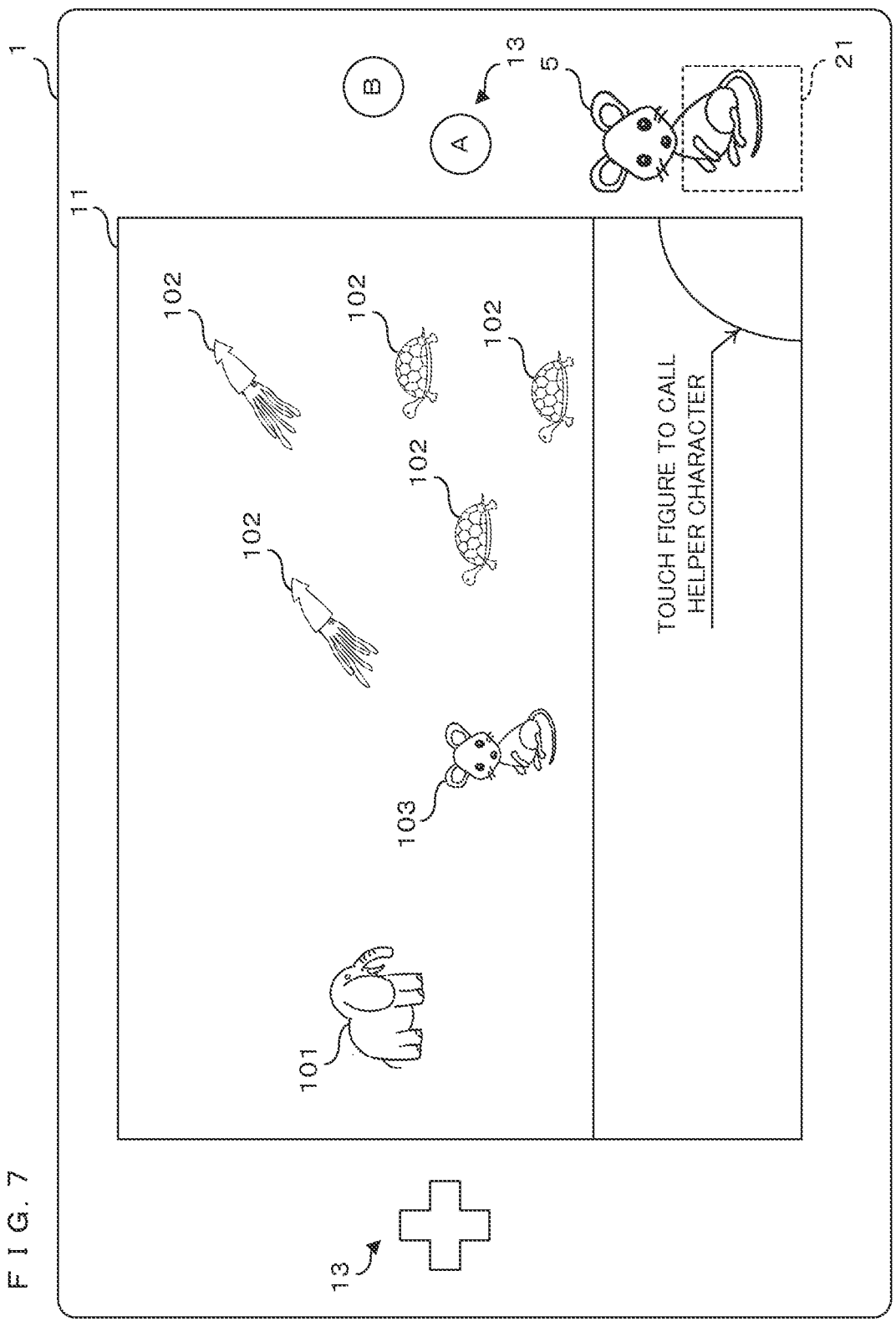
FIG. 7 shows an example non-limiting schematic diagram for explaining a helper character.

With the present embodiment, after initiation of a game, the user can cause a character corresponding to the dedicated FIG. 5 to appear in the game as a helper character by causing the game machine 1 to load the dedicated FIG. 5. FIG. 7 shows an example non-limiting schematic diagram for explaining a helper character. In the example illustrated in the figure, a character of a mouse is displayed in the game screen as a helper character 103, corresponding to the dedicated FIG. 5 of a mouse. For example, the helper character 103 automatically attacks an enemy character 102 for a certain time. Processing of the helper character 103 is performed automatically on the basis of loading of the dedicated FIG. 5, not depending on selection by the user.

It is to be noted that the processing unit 10 of the game machine 1 may make the following limitation regarding the helper character 103. For example, when the player character 101 is a character corresponding to the dedicated FIG. 5, the game machine 1 may make limitation not to cause a character corresponding to the same dedicated FIG. 5 to appear as a helper character 103. For example, the game machine 1 may limit the number of times the helper character 103 appears in one game. The processing unit 10 of the game machine 1 may cause the helper character 103 to appear in accordance with contactless communication with the IC card 6 after initiation of a game.

Figure 8:
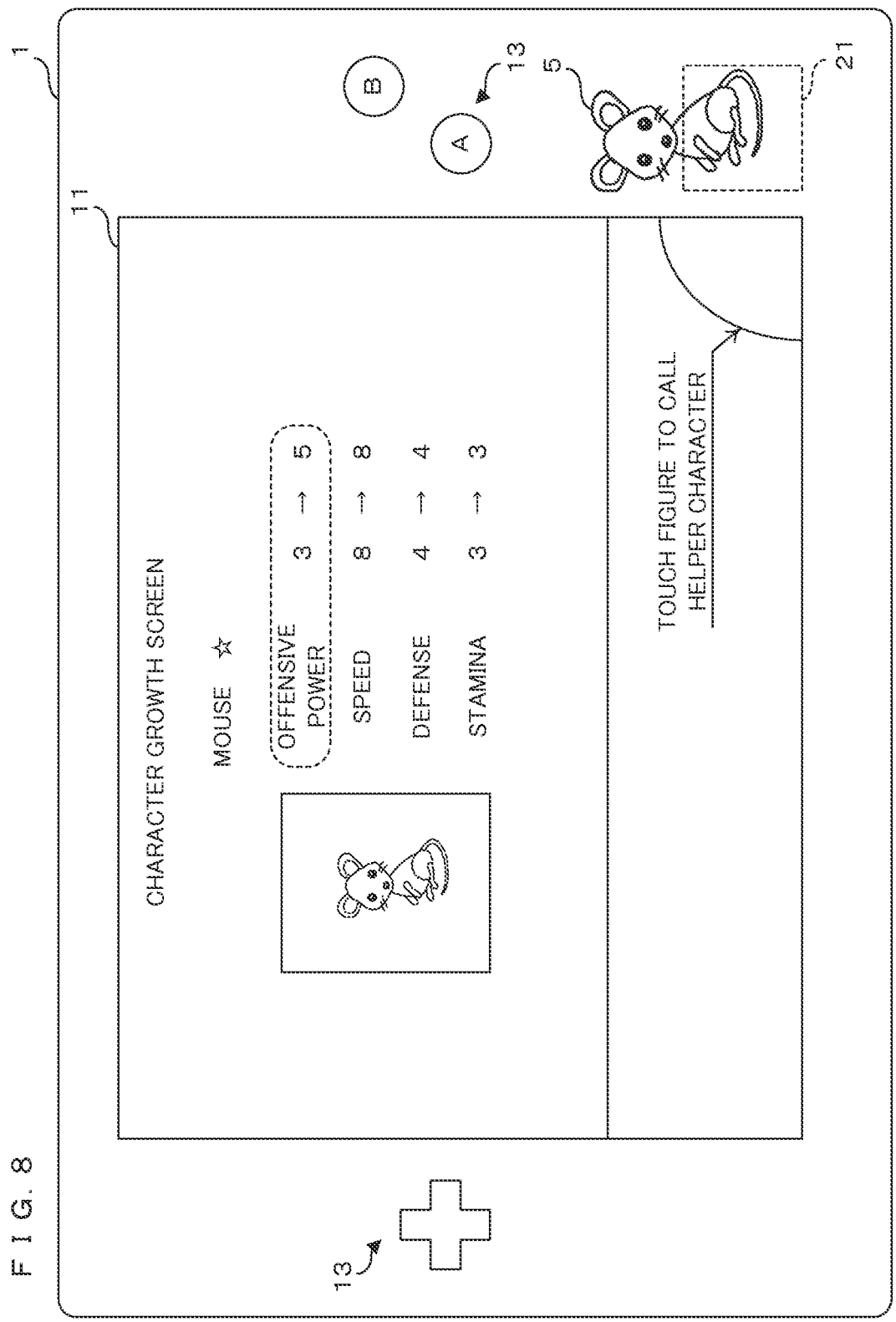
FIG. 8 shows an example non-limiting schematic diagram for explaining increase in status of a character.

With the present embodiment, the user can obtain a point in accordance with his performance in the game. The user can increase status, such as an offensive power and a speed, of a character using an obtained point. A character having status which can be increased is a character corresponding to the dedicated FIG. 5. FIG. 8 shows an example non-limiting schematic diagram for explaining increase in status of a character. When the user selects growth of a character from a menu or the like, for example, the processing unit 10 of the game machine 1 displays a character growth screen illustrated in the figure. It is to be noted that the processing unit 10 may display a character growth screen illustrated in the figure after displaying a list of characters which can be grown by the user and accepting selection of a character to be grown from the list, for example.

In the character growth screen, the user can increase status, such as an offensive power and a speed, of a character using the operation unit 13. The user increases the status and then causes the game machine 1 to load the dedicated FIG. 5 of a corresponding character, so as to update the status data 53b stored in the storage unit 53 of the dedicated FIG. 5. The processing unit 10 of the game machine 1 accepts an operation to increase status by the operation unit 13 and increases the status of the character. Thereafter, the processing unit 10 displays a message to prompt the user to perform an operation to load a corresponding dedicated FIG. 5. In the example illustrated in the figure, the game machine 1 displays a message "Touch Character Having Status to be Grown" on the lower right of the display unit 11 or, in other words, in the vicinity of a position where the contactless communication unit 21 is mounted.

The processing unit 10 of the game machine 1 performs contactless communication with the dedicated FIG. 5 by the contactless communication 21 and acquires the identification data 53a stored in the storage unit 53. The processing unit 10 determines whether the dedicated FIG. 5 of a contactless communication partner corresponds to a character having status which has been increased or not. When the dedicated FIG. 5 does not correspond to a character having status which has been increased, the processing unit 10 displays an error message or the like at the display unit 11. When the dedicated FIG. 5 corresponds to a character having status which has been increased, the processing unit 10 transmits a rewrite command of the status data 53b to the dedicated FIG. 5 by the contactless communication unit 21 together with new status data 53b. The IC tag 50 of the dedicated FIG. 5 updates the status data 53b stored in the storage unit 53 in accordance with the rewrite command from the game machine 1.

As described above, the user can enjoy a game using a character having status which has been increased even when the user plays a game with another game machine 1, by updating the status data 53b stored in the storage unit 53 of the dedicated FIG. 5. It is to be noted that the game machine 1 in the present embodiment does not perform processing to write the status data of a character corresponding to the IC card 6 into the storage unit of the IC tag 60 of the IC card 6.

Figure 9:
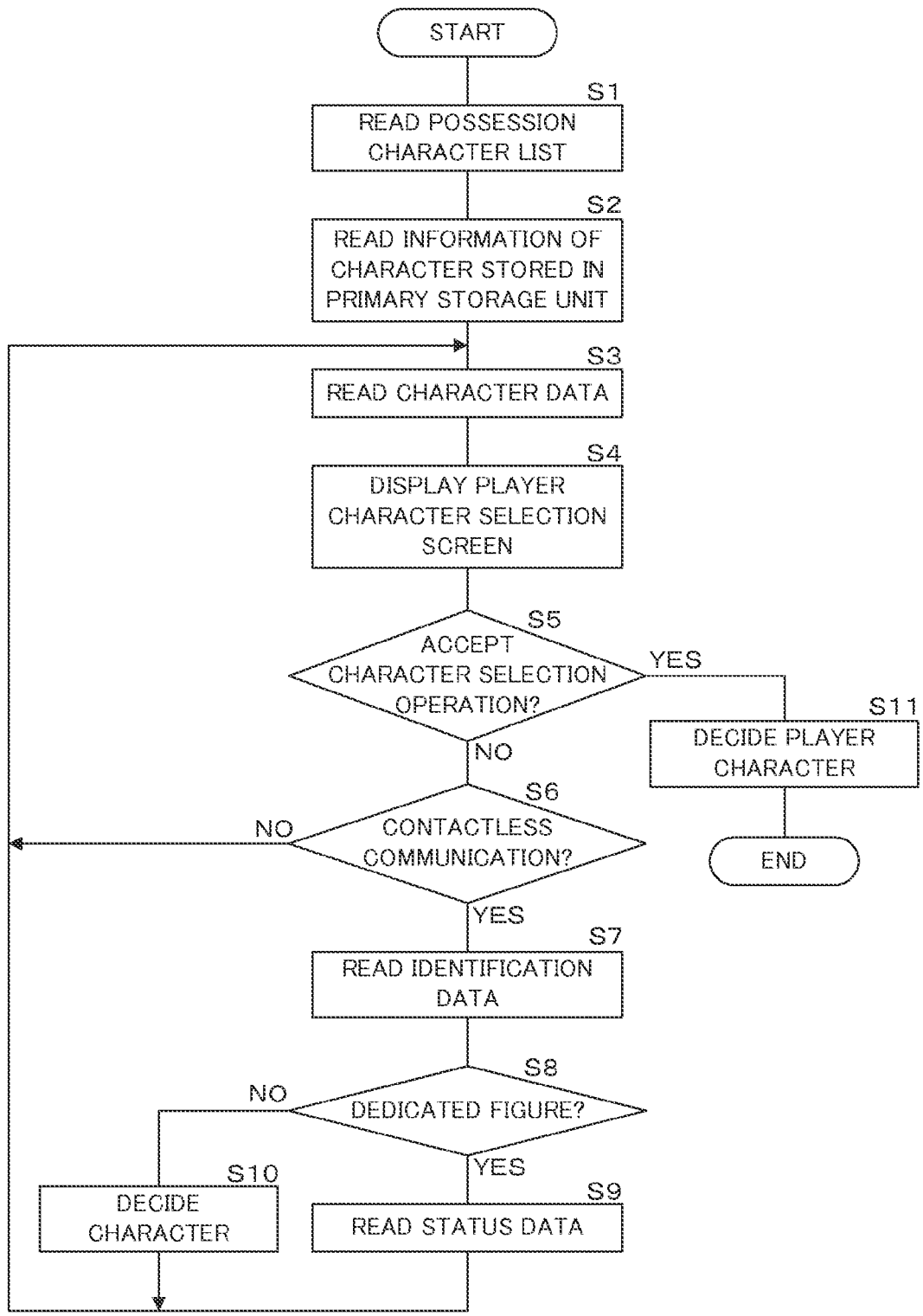
FIG. 9 shows an example non-limiting flowchart for illustrating the procedures of player character selection acceptance processing to be performed by a game machine.

Next, processing to be performed by the game machine 1 according to the present embodiment will be explained using a flowchart. FIG. 9 shows an example non-limiting flowchart for illustrating the procedures of player character selection acceptance processing to be performed by the game machine 1. When an item of player character selection is selected from a menu or the like displayed at the display unit 11, for example, the processing unit 10 of the game machine 1 reads the possession character list stored in the secondary storage unit 16 together with saved data of a game (step S1). The processing unit 10 reads information of a character stored in the primary storage unit 15 (step S2). It is to be noted that the information of a character to be read in the step S2 is identification data, status data and the like, which have been read before by contactless communication with the dedicated FIG. 5 or the IC card 6.

The processing unit 10 reads the character data 92 stored in the secondary storage unit 16 (step S3). Thus, the processing unit 10 acquires image data, status and the like pertaining to a character, which is included in the possession character list read in the step S1, and a character according to information read in the step S2. The processing unit 10 generates a player character selection screen, which displays a list of characters that can be selected by the user, at the display processing unit 33 in accordance with the acquired image data, status and the like, and displays the generated player character selection screen at the display unit 11 (step S4).

When a player character selection screen is displayed, the processing unit 10 accepts an operation to the operation unit 13 by the operation acceptance processing unit 31 and determines the operation content. Thus, the processing unit 10 determines whether a character selection operation has been accepted or not (step S5). When a character selection operation has not been accepted (S5: NO), the processing unit 10 determines whether contactless communication with the dedicated FIG. 5 or the IC card 6 has been performed by the contactless communication unit 21 or not (step S6). When contactless communication has not been performed (S6: NO), the processing unit 10 returns the process to the step S3. The processing unit 10 waits until it accepts a character selection operation or until contactless communication is performed.

When contactless communication is performed (S6: YES), the tag data processing unit 34 of the processing unit 10 performs contactless communication with the dedicated FIG. 5 or the IC card 6. By contactless communication, the data processing unit 34 reads the identification data 53a stored in the storage unit 53 of the IC tag 50 or the identification data stored in the storage unit of the IC tag 60 (step S7). The tag data processing unit 34 determines whether the partner of contactless communication is the dedicated FIG. 5 or not on the basis of the read identification data (step S8). When the partner of contactless communication is the dedicated FIG. 5 (S8: YES), the tag data processing unit 34 reads the status data 53b stored in the storage unit 53 of the dedicated FIG. 5 by contactless communication (step S9) and returns the process to the step S3. When the partner of contactless communication is not a dedicated FIG. 5 (S8: NO) or, in other words, when the partner of contactless communication is an IC card 6, the tag data processing unit 34 decides a character on the basis of the identification data read in the step S7 (step S10) and returns the process to the step S3. The processing unit 10 reads data of a character corresponding to the dedicated FIG. 5 or the IC card 6 which has performed contactless communication in the step S3. The processing unit 10 displays a player character selection screen, which includes the read character that has been added, in the step S4.

When accepting a character selection operation in the step S5 (S5: YES), the processing unit 10 decides that the player character is the selected character (step S11) and terminates the player character selection acceptance processing.

Figure 10:
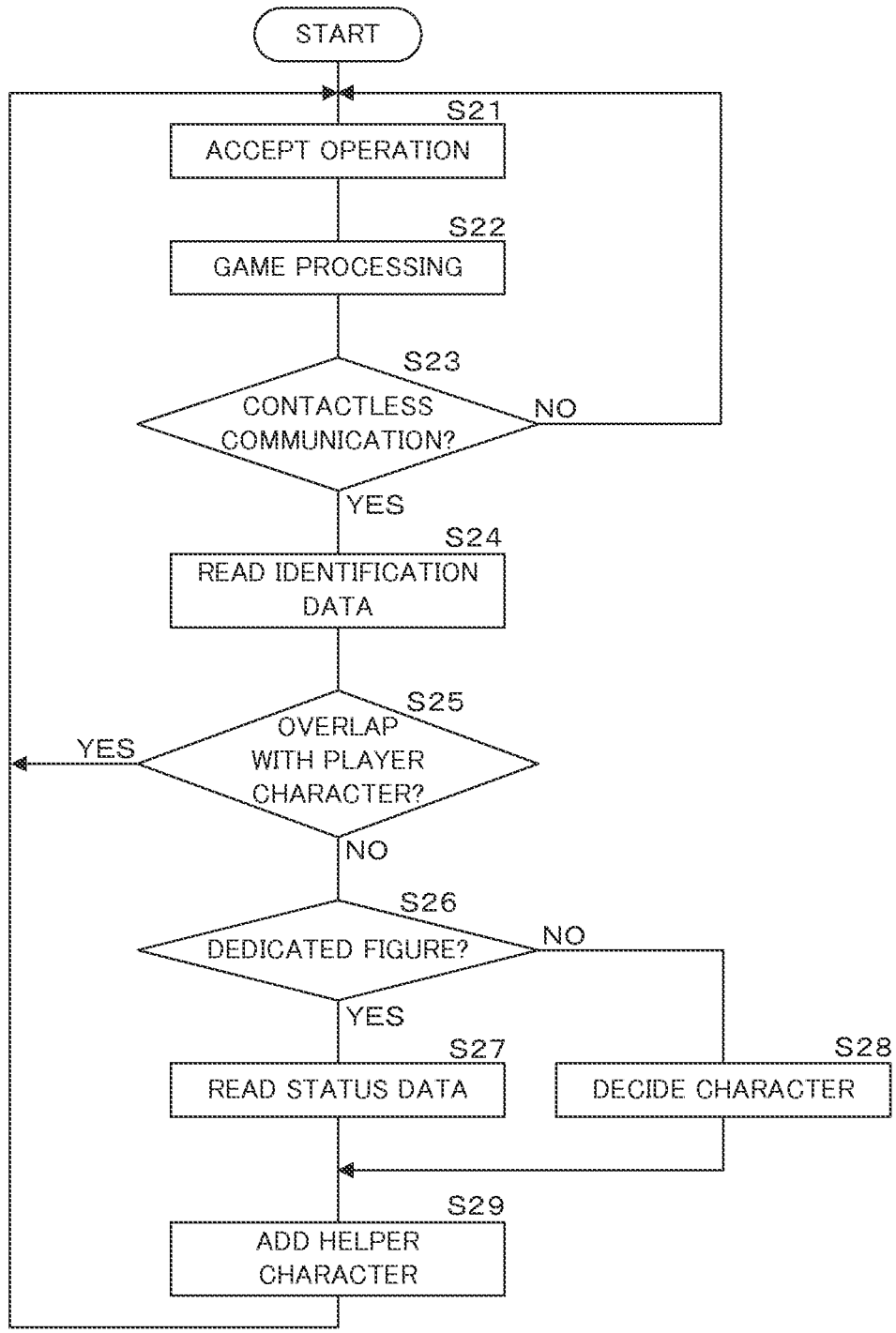
FIG. 10 shows an example non-limiting flowchart for illustrating the procedures of game processing to be performed by a game machine.

FIG. 10 shows an example non-limiting flowchart for illustrating the procedures of game processing to be performed by the game machine 1. When accepting a game initiation operation, the processing unit 10 of the game machine 1 initiates game processing. The processing unit 10 accepts an operation to the operation unit 13 by the operation acceptance processing unit 31 (step S21). The game processing unit 32 of the processing unit 10 performs game processing in accordance with the accepted operation (step S22). Game processing is, for example, determination of success/failure or the like of movement or attack of a player character according to an accepted operation; movement or attack of an enemy character according to a predetermined routine for game programming or the like; and attack by a player character and an enemy character. The processing unit 10 determines whether contactless communication with the dedicated FIG. 5 or the IC card 6 has been performed by the contactless communication unit 21 during game processing or not (step S23). When contactless communication has not been performed (S23: NO), the processing unit 10 returns the process to the step S21.

When contactless communication has been performed (S23: YES), the tag data processing unit 34 of the processing unit 10 performs contactless communication by the contactless communication unit 21. By contactless communication, the tag data processing unit 34 reads the identification data 53a stored in the storage unit 53 of the IC tag 50 or the identification data stored in the storage unit of the IC tag 60 (step S24). The processing unit 10 determines whether a character pertaining to the read identification data overlaps with a player character or not (step S25). When the character pertaining to the identification data overlaps with the player character (S25: YES), the processing unit 10 returns the process to the step S21.

When the character pertaining to the identification data does not overlap with the player character (S25: NO), the tag data processing unit 34 determines whether the partner of contactless communication is a dedicated FIG. 5 or not on the basis of the read identification data (step S26). When the partner of contactless communication is a dedicated FIG. 5 (S26: YES), the tag data processing unit 34 reads the status data 53b stored in the storage unit 53 of the dedicated FIG. 5 by contactless communication (step S27). When the partner of contactless communication is not a dedicated FIG. 5 (S26: NO), the tag data processing unit 34 decides a character on the basis of the identification data read in the step S24 (step S28). Thereafter, the processing unit 10 adds a character corresponding to the dedicated FIG. 5 or the IC card 6, which has performed contactless communication, to the game as a helper character (step S29), and returns the process to the step S21 so as to perform game processing which includes the helper character.

Figure 11:
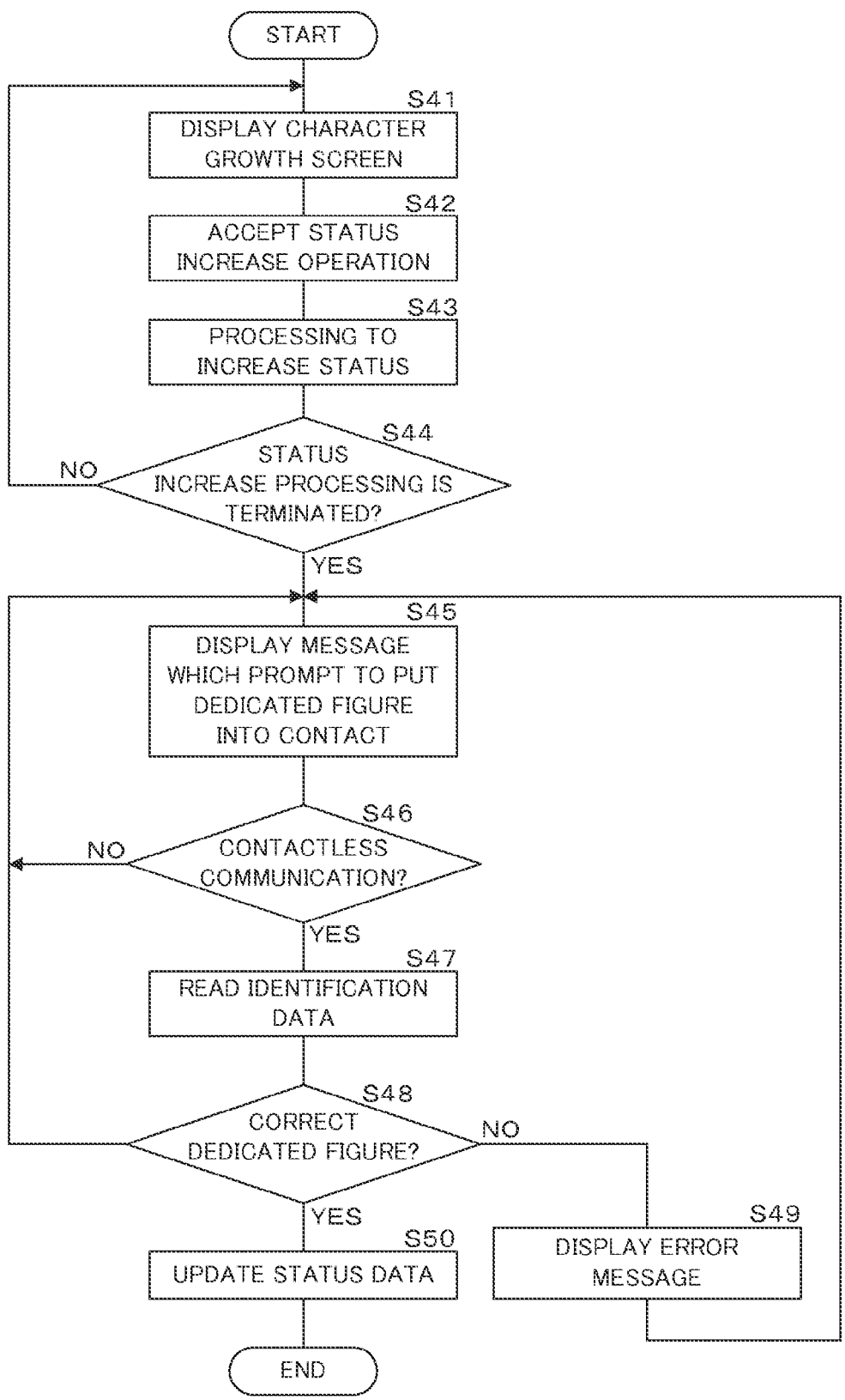
FIG. 11 shows an example non-limiting flowchart for illustrating the procedures of status data update processing of a dedicated figure to be performed by a game machine.

FIG. 11 shows an example non-limiting flowchart for illustrating the procedures of status data update processing of the dedicated FIG. 5 to be performed by the game machine 1. When an item of character growth is selected from a menu or the like displayed at the display unit 11, for example, the processing unit 10 of the game machine 1 generates a character growth screen by the display processing unit 33 and displays the generated character growth screen at the display unit 11 (step S41). The processing unit 10 accepts a status increase operation of a character by the operation acceptance processing unit 31 (step S42). The processing unit 10 performs processing to increase status according to the accepted operation (step S43). The processing unit 10 determines whether status increase processing is to be terminated on the basis of a factor such as a status confirmation operation or not (step S44). When determining that status increase processing is not to be terminated (S44: NO), the processing unit 10 returns the process to the step S41.

When determining that status increase processing is to be terminated (S44: YES), the processing unit 10 displays a message, which prompts to put the dedicated FIG. 5 into contact with or adjacent to the game machine 1, at the display unit 11 by the display processing unit 33 (step S45). The processing unit 10 determines whether contactless communication with the dedicated FIG. 5 or the IC card 6 has been performed by the contactless communication unit 21 or not (step S46). When contactless communication has not been performed (S46: NO), the processing unit 10 returns the process to the step S45 and continues displaying of a message.

When contactless communication has been performed (S46: YES), the tag data processing unit 34 of the processing unit 10 performs contactless communication by the contactless communication unit 21. By contactless communication, the tag data processing unit 34 reads the identification data 53a stored in the storage unit 53 of the IC tag 50 or the identification data stored in the storage unit of the IC tag 60 (step S47). The processing unit 10 determines whether a character pertaining to the read identification data coincides with a character having status which is to be increased or not or, in other words, whether contactless communication with a correct dedicated FIG. 5 has been performed or not (step S48). When contactless communication with a correct dedicated FIG. 5 has not been performed (S48: NO), the processing unit 10 displays an error message at the display unit 11 by the display processing unit 33 (step S49) and returns the process to the step S45. When contactless communication with a correct dedicated FIG. 5 has been performed (S48: YES), the tag data processing unit 34 gives a write command of the status data 53b to the dedicated FIG. 5 by contactless communication. Upon receiving the write command, the tag data processing unit 34 updates the status data 53b of the dedicated FIG. 5 (step S50) and terminates the status data update processing. It is to be noted that processing at each step in the flowcharts illustrated in FIGS. 9 to 11 is exemplary, and the process procedures of the respective steps may be interchanged, or another processing may be executed in addition to or instead of processing at each step, as long as a similar result can be obtained.

In a game system according to the present embodiment having the above configuration, the game machine 1 stores data pertaining to a plurality of characters in the secondary storage unit 16 or the recording medium 9 as character data 92. The game machine 1 displays at least one character among a plurality of stored characters at the display unit 11 as a selection object of a player character of the user. The game machine 1 performs contactless communication with the IC tag 50 of the dedicated FIG. 5 by the contactless communication unit 21 and acquires data such as the identification data 53a. The game machine 1 displays a character according to the acquired data at the display unit 11 as a selection object of a player character. The game machine 1 accepts selection of a player character from characters displayed as selection objects, and performs game processing using the accepted player character. Thus, it is possible to increase options of a player character for the user and improve the attraction of a game. The game machine 1 displays both of a character stored in the secondary storage unit 16 and a character corresponding to the dedicated FIG. 5 as selection objects. Thus, the user can easily select a character, and therefore it is possible to improve the operability, the convenience and the like pertaining to a game. It is to be noted that a character selected by the user is operated as a player character. A plurality of characters, which can be selected, respectively have different status, such as offensive powers and speeds, and therefore a change occurs in game processing depending on which character is selected.

The game machine 1 displays a plurality of characters as selection objects in such a manner that a character pertaining to the dedicated FIG. 5 can be distinguished from the other characters. For example, the game machine 1 attaches a star mark at the name of a character pertaining to the dedicated FIG. 5 in display. Thus, the user can easily judge which character pertains to a dedicated FIG. 5.

The IC tag 50 of the dedicated FIG. 5 stores the status data 53b of a character in the storage unit 53. The game machine 1 acquires the status data 53b from the dedicated FIG. 5 by contactless communication. The game machine 1 reflects the acquired status data 53b on status, such as an offensive power and a speed, of a character to be displayed as a selection object. The game machine 1 changes the status of a character in accordance with game results or the like and updates the status data 53b stored in the dedicated FIG. 5 by contactless communication. Thus, the user can write data of a grown character into the dedicated FIG. 5 with one game machine 1 and enjoy a game using the grown character with another game machine 1. In updating of the status data 53b, the game machine 1 checks that a dedicated FIG. 5, which is performing contactless communication, is a dedicated FIG. 5 having status data 53b which is to be updated. Thus, it is possible to prevent status data 53b of another dedicated FIG. 5 from being updated.

The game machine 1 stores data such as the identification data 53a and the status data 53b acquired from the dedicated FIG. 5 in the primary storage unit 15. In displaying of a plurality of characters as selection objects, the game machine 1 also displays a character according to data stored in the primary storage unit 15 as a selection object. Thus, it becomes unnecessary to put the same dedicated FIG. 5 into contact with or adjacent to the game machine 1 every time the user selects a player character, and therefore the convenience is improved. It is to be noted that the data stored in the primary storage unit 15 is discarded when a game is terminated or when the game machine 1 is powered off, for example.

The game machine 1 can perform contactless communication not only with a specific dedicated FIG. 5 correlated with the game program 91 but also with other elements such as the IC card 6. The game machine 1 acquires the identification data stored in the IC card 6 by contactless communication. The game machine 1 decides a character on the basis of the acquired identification data. The game machine 1 acquires data related to the decided character from the character data 92 and displays the character as a selection object of a player character. Thus, the user can increase options of a player character even when he does not possess a dedicated FIG. 5. The user can enjoy checking which character is displayed, by causing the game machine 1 to load a variety of IC cards 6 existing around the user, and the attraction of a game can be improved. The game machine 1 displays a character pertaining to an IC card 6 and other characters in a distinguishable manner. For example, the game machine 1 attaches a double circle mark at the name of the character pertaining to an IC card 6 in display. Thus, the user can easily judge which character pertains to the IC card 6. It is to be noted that the game machine 1 does not perform processing to increase status of the character pertaining to the IC card 6, processing to write the status data into the storage unit of the IC card 6, and the like. Thus, it is possible to prevent data, which is to be utilized for the original purpose of the IC card 6, from being rewritten.

During game processing pertaining to a player character selected by the user, the game machine 1 can perform contactless communication with a dedicated FIG. 5 or an IC card 6 by the contactless communication unit 21. The game machine 1 causes a character according to data acquired from the dedicated FIG. 5 or the IC card 6 by contactless communication to appear in a game as a helper character in game processing. Thus, the user can use the dedicated FIG. 5 or the IC card 6 for a purpose other than adding a character which can be selected as a player character. It is to be noted that the game machine 1 causes a character to appear in a game as a helper character when the character according to data acquired from the dedicated FIG. 5 or the IC card 6 differs from a player character.

The game machine 1 has a built-in contactless communication unit 21. Thus, the user does not need to perform a work such as connection of the game machine 1 with another apparatus in order to perform contactless communication. The user can easily perform contactless communication with the game machine 1 by putting the dedicated FIG. 5 or the IC card 6 into contact with or adjacent to the game machine 1. The contactless communication unit 21 of the game machine 1 is disposed adjacent to the display unit 11, and the game machine 1 displays, at a part of the display unit 11 close to the place where the contactless communication unit 21 is disposed, a message, an image or the like which prompts to put the dedicated FIG. 5 or the IC card 6 into contact with or adjacent to the game machine 1. Thus, the user can easily grasp which part of the game machine 1 the dedicated FIG. 5 or the IC card 6 is to be put into contact with or adjacent to.

Although an example of a game wherein a player character operated by the user attacks an enemy character has been described in the present embodiment, it is to be noted that the game content is exemplary and not restrictive. Although the game machine 1 in the present embodiment is designed to add a character to be selected as a player character by performing contactless communication with the dedicated FIG. 5 or the IC card 6, a content to be added as an option by contactless communication is not limited to a character. For example, a stage to appear in a game, or a weapon, an item or the like to be used by a player character may be added. Similar technology can be applied to an application other than a game. For example, an electronic book may be additionally displayed at a bookshelf, which includes a plurality of electronic books arranged therein, in accordance with contactless communication with an IC card or the like, so as to allow the user to select an electronic book to browse. Similarly, a content such as a moving image, a still image or music may be treated. Moreover, the game screens illustrated in FIGS. 3 to 8 are exemplary and not restrictive.

Although the present embodiment has been described using the game machine 1 of a portable type as an example, this is not restrictive. For example, similar technology can be applied to a variety of information processing apparatuses such as a stationary game machine, a generic computer, a tablet type terminal device or a portable phone. In the case of a stationary game machine, the contactless communication unit 21 may be built not in the body portion but in a portable type controller or the like. In the case of an apparatus such as a generic computer which does not have a built-in contactless communication unit 21, another device for performing contactless communication may be connected wiredly or wirelessly.

Although a dedicated FIG. 5 is used as a specific data storage medium corresponding to the game program 91 in the present embodiment, this is not restrictive. A data storage medium may be a dedicated IC card or the like, or may be another type of a medium. Although the game machine 1 in the present embodiment is designed to perform contactless communication according to the NFC standard, this is not restrictive. The game machine 1 may be designed to perform contactless communication according to a communication standard other than NFC. A part or whole of processing, which is performed by the processing unit 10 of the game machine 1 in the present embodiment, may be performed by another apparatus such as a server machine, so that processing is realized by cooperation of a plurality of apparatuses. A variety of programs or data such as the game program 91 or the character data 92 may be stored in a apparatus such as a server machine, so that the game machine 1 acquires a program or data from the server machine as necessary.

Although the processing unit 10 of the game machine 1 in the present embodiment executes the game program 91 so that units from the operation acceptance processing unit 31 to the tag data processing unit 34 are provided in the processing unit 10 as software functional blocks, this is not restrictive. A part of functions of units from the operation acceptance processing unit 31 to the tag data processing unit 34 may be provided as a function of an OS (Operating System), for example. A part of functions of units from the operation acceptance processing unit 31 to the tag data processing unit 34 may also be provided as hardware functional blocks.

Although the game machine 1 in the present embodiment is designed to acquire data such as an image of a character to be displayed in a game screen from the character data 92 stored in the secondary storage unit 16 or the recording medium 9, this is not restrictive. For example, the game machine 1 may be designed to store data such as an image of a character in the storage unit 53 of the IC tag 50 of the dedicated FIG. 5. Although the storage unit 53 of the dedicated FIG. 5 in the present embodiment is designed to store the status data 53b, such as an offensive power and a speed, of a character, data to be stored is not limited to this. The storage unit 53 of the dedicated FIG. 5 may store information related to a user who possesses the dedicated FIG. 5, for example. The storage unit 53 of the dedicated FIG. 5 may also store saved data of a game, for example, or may store a variety of other data.

When used in the present specification, each element or the like denoted in a singular form with a word "a" or "an" attached in front thereof is to be understood not to eliminate the possibility of a plurality of elements related thereto.

An information processing apparatus according to the present embodiment, which displays a stored content and a content according to data acquired by contactless communication as selection objects, can increase options for the user and improve the attraction of an application such as a game pertaining to the contents.

What is claimed is:

1. An information processing apparatus comprising:
a processor for performing information processing pertaining to a game;
a content storage unit for storing a plurality of player objects to be operated by a user in the game: and
a contactless communication circuit for performing contactless communication with a data storage medium having a contactless communication function,
wherein the processor performs the processing of:
acquiring data stored in the data storage medium by the contactless communication circuit;
displaying at least one player object stored in the content storage unit and a player object according to acquired data on a display unit as selection objects;
accepting selection by a user for at least one of the displayed player objects;
performing information processing pertaining to the selected player object which is an object of an accepted selection, wherein the selected player object is an object which the user can directly control an action thereof by operation to an operation part of the information processing apparatus;
updating data read from the data storage medium by the contactless communication circuit in accordance with the information processing performed by the processor;
displaying a player object selection screen that includes at least one selectable player object;
while displaying the player object screen, when the contactless communication circuit performs contactless communication with a data storage medium, adding a player object in accordance with the data acquired by the data storage medium to the player object screen and displaying the player object;
accepting a player object selection operation at an operation unit while displaying the player object selection screen;
displaying a game screen that includes the accepted player object; and
accepting an operation for causing the player object to act at the operation unit while displaying the game screen.

2. The information processing apparatus according to claim 1, wherein the processor performs the processing of:
displaying a player object stored in the content storage unit at the display unit; and
additionally displaying a player object according to data when the data is acquired from the data storage medium.

3. The information processing apparatus according to claim 1, wherein the processor performs the processing of:
displaying a player object according to the acquired data and a player object other than said player object in a distinguishable manner.

4. The information processing apparatus according to claim 1, wherein the selected player object, which is an object of selection accepted in the processing performed by the processor, causes a change in processing of an application to be executed by the processor.

5. The information processing apparatus according to claim 1, wherein the processor performs the processing of:

determining whether a data storage medium, which is an object of contactless communication by the contactless communication circuit, is a data storage medium corresponding to the updated data or not; and
performing processing to write data into the data storage medium by the contactless communication circuit,
writing updated data into the data storage medium if the processor determines that a data storage medium, which is an object of contactless communication by the contactless communication circuit, is a data storage medium corresponding to the updated data.

6. The information processing apparatus according to claim 1, wherein
the processor performs the processing of displaying a player object according to data, which is stored in a data storage unit for storing acquired data, as a selection object, and
the information processing apparatus discards the data when information processing performed by the processor is terminated.

7. The information processing apparatus according to claim 1, wherein the contactless communication circuit performs contactless communication with both of a first data storage medium, which is preliminarily associated with a player object used for an application to be executed by the processor, and a second data storage medium, association of the second data storage medium with the content being decided in accordance with read data.

8. The information processing apparatus according to claim 7, wherein the processor performs the processing of
displaying a player object associated with the first data storage medium and a player object decided in accordance with data read from the second data storage medium in a distinguishable manner.

9. An information processing apparatus comprising:
a processor for performing information processing pertaining to a game;
a content storage unit for storing a plurality of player objects to be operated by a user in the game: and
a contactless communication circuit for performing contactless communication with a data storage medium having a contactless communication function,
wherein the processor performs the processing of:
acquiring data stored in the data storage medium by the contactless communication circuit;
displaying at least one player object stored in the content storage unit and a player object according to acquired data on a display unit as selection objects;
accepting selection by a user for at least one of the displayed player objects;
performing information processing pertaining to the selected player object which is an object of an accepted selection, wherein the selected player object is an object which the user can directly control an action thereof by operation to an operation part of the information processing apparatus; and
updating data read from the data storage medium by the contactless communication circuit in accordance with the information processing performed by the processor;
wherein the contactless communication circuit performs contactless communication with both of a first data storage medium, which is preliminarily associated with a player object used for an application to be executed by the processor, and a second data storage medium, association of the second data storage medium with the content being decided in accordance with read data;
wherein the processor further performs the processing of:

determining whether a data storage medium, which is an object of contactless communication by the contactless communication circuit, is the first data storage medium or the second data storage medium;

performing processing to write data if the processor determines that a data storage medium, which is an object of contactless communication by the contactless communication circuit, is the first data storage medium; and not performing processing to write data if the processor determines that a data storage medium, which is an object of contactless communication by the contactless communication circuit, is the second data storage medium.

10. The information processing apparatus according to claim 1, wherein the processor automatically performs information processing based on another player object according to acquired data when the data stored in the data storage medium is acquired by the contactless communication circuit during execution of an application, after the processor performs the processing of accepting selection of the at least one of the player objects by the user.

11. The information processing apparatus according to claim 10, wherein the processor automatically performs information processing based on said another player object if said one player object differs from said another player object.

12. The information processing apparatus according to claim 1, wherein the contactless communication circuit is built therein.

13. An information processing system comprising:
a processor for performing information processing pertaining to a game;
a content storage unit for storing a plurality of player objects to be operated by a user in the game and
a contactless communication circuit for performing contactless communication with a data storage medium having a contactless communication function,
wherein the processor performs the processing of:
acquiring data stored in the data storage medium by the contactless communication circuit;
displaying at least one player object stored in the content storage unit and a player object according to acquired data on a display unit as selection objects;
accepting selection by a user for at least one of the displayed player objects;
performing information processing pertaining to the selected player object which is an object of an accepted selection and is an object which the user can directly control an action thereof by operation to an operation part of the information processing system;
displaying a player object selection screen that includes at least one selectable player object;
while displaying the player object screen, when the contactless communication circuit performs contactless communication with a data storage medium, adding a player object in accordance with the data acquired by the data storage medium to the player object screen and displaying the player object;
accepting a player object selection operation at the operation unit while displaying the player object selection screen;
displaying a game screen that includes the accepted player object; and
accepting an operation for causing the player object to act at the operation unit while displaying the game screen.

14. An information processing method comprising:
performing contactless communication, using a contactless communication circuit, with a data storage medium having a contactless communication function and acquiring data stored in the data storage medium;
displaying, on a display, at least one player object stored in a content storage unit and a player object according to data acquired from the data storage medium on a display unit as selection objects, the player objects to be operated by a user in a game;
accepting selection, via a button or touch panel, by a user for at least one of the displayed player objects; and
performing information processing of the game, using a computer processor, pertaining to the selected player object, which is an object of accepted selection and is an object which the user can directly control an action thereof by operation to an operation part, and
displaying a player object selection screen that includes at least one selectable player object;
while displaying the player object screen, when the contactless communication circuit performs contactless communication with a data storage medium, adding a player object in accordance with the data acquired by the data storage medium to the player object screen and displaying the player object;
accepting a player object selection operation at the operation unit while displaying the player object selection screen;
displaying a game screen that includes the accepted player object; and
accepting an operation for causing the player object to act at the operation unit while displaying the game screen.

15. A non-transitory recording medium having a computer program recorded therein, the computer program causing a computer to:
display at least one player object stored in a content storage unit and a player object according to data acquired from a data storage medium having a contactless communication function by contactless communication on a display unit as selection objects, the player objects to be operated by a user in a game;
accept selection by a user for at least one of the displayed player objects; and
perform information processing of the game pertaining to the selected player object, which is an object of the accepted selection and is an object which the user can directly control an action thereof by operation to an operation part, and
displaying a player object selection screen that includes at least one selectable player object;
while displaying the player object screen, when the contactless communication circuit performs contactless communication with a data storage medium, adding a player object in accordance with the data acquired by the data storage medium to the player object screen and displaying the player object;
accepting a player object selection operation at the operation unit while displaying the player object selection screen;
displaying a game screen that includes the accepted player object; and
accepting an operation for causing the player object to act at the operation unit while displaying the game screen.

16. An information processing apparatus comprising:
a processor;
a content storage unit for storing a plurality of contents: and a contactless communication circuit for performing contactless communication with a data storage medium having a contactless communication function, wherein the processor performs the processing of:
    acquiring data stored in the data storage medium by the contactless communication circuit;
    displaying at least one content stored in the content storage unit and a content according to acquired data on a display unit as selection objects;
    accepting selection by a user for a displayed content;
    performing information processing pertaining to a content which is an object of an accepted selection; and
    updating data read from the data storage medium by the contactless communication circuit in accordance with the information processing performed by the processor wherein the contactless communication circuit performs contactless communication with both of a first data storage medium, which is preliminarily associated with a content used for an application to be executed by the processor, and a second data storage medium, association of the second data storage medium with the content being decided in accordance with read data, wherein the processor further performs the processing of:
    determining whether a data storage medium, which is an object of contactless communication by the contactless communication circuit, is the first data storage medium or the second data storage medium;
    performing processing to write data if the processor determines that a data storage medium, which is an object of contactless communication by the contactless communication circuit, is the first data storage medium; and
    not performing processing to write data if the processor determines that a data storage medium, which is an object of contactless communication by the contactless communication circuit, is the second data storage medium.

\* \* \* \* \*